(12) United States Patent
Mehta et al.

(10) Patent No.: US 7,582,155 B2
(45) Date of Patent: Sep. 1, 2009

(54) ASPHALT NANOCOMPOSITE-BASED ROOFING PRODUCTS

(75) Inventors: Vinay Mehta, Bridgewater, NJ (US); Brian Kanze, Wanaque, NJ (US); Krishna Srinivasan, Mahwah, NJ (US); Awdhoot Vasant Kerkar, Rockaway, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 399 days.

(21) Appl. No.: 11/385,597

(22) Filed: Mar. 21, 2006

(65) Prior Publication Data

US 2007/0221095 A1   Sep. 27, 2007

(51) Int. Cl.
*C08L 95/00* (2006.01)
*C09D 195/00* (2006.01)

(52) U.S. Cl. .................................. 106/284.01
(58) Field of Classification Search ............. 106/284.01
See application file for complete search history.

(56) References Cited

U.S. PATENT DOCUMENTS 3,274,016 A * 9/1966 Rogers et al. ........... 106/284.01
3,582,367 A * 6/1971 Miller et al .............. 106/14.36
5,652,284 A * 7/1997 Eidt et al. ...................... 524/64
5,652,289 A * 7/1997 Eisenhart et al. ............ 524/376
7,169,467 B2 * 1/2007 Wilson .................... 428/317.9

FOREIGN PATENT DOCUMENTS

EP    001728831 A1 *  6/2006

OTHER PUBLICATIONS

Tu et al., "Recovery of bitumen from oilsands . . . ", Fuel 894 (2005) 653-660, published online Sep. 11, 2004.*

* cited by examiner

*Primary Examiner*—David M Brunsman
(74) *Attorney, Agent, or Firm*—Sills Cummis & Gross P.C.; William J. Davis, Esq.

(57) ABSTRACT

An asphalt-based nanocomposite useful as a coating for various applications including building materials products, such as shingles, is provided. The asphalt-based nanocomposites are particle-filled matrices that include an asphalt flux or derivate thereof and a layered clay mineral in an amount ranging from about 1 to about 15 weight %. Coated articles such as shingles including the asphalt-based nanocomposite are also disclosed as well as various methods of preparing the asphalt-based nanocomposite.

8 Claims, 5 Drawing Sheets

ASPHALT NANOCOMPOSITE-BASED ROOFING PRODUCTS

FIELD OF THE INVENTION

The present invention relates to a composite material, and more particularly to an asphalt-based nanocomposite that is useful as a coating for various products including, for example, building materials such as asphaltic roll products and shingles. The asphalt-based nanocomposite of the present invention can be coated onto any material layer, including the substrate layer, of the products that include (1) dip coated substrate based products such as shingles as well as peel & stick roll products, and (2) coated products with or without a carrier or strength film or layer such as ice & waterproofing underlayments. The term "nanocomposite" is used throughout the present application to denote particle-filled matrices in which at least one dimension of the dispersed particles is on a nanometer ($10^{-9}$ m) scale.

BACKGROUND OF THE INVENTION

Layered clay materials such as, for example, montmorillonite, hectorite, saponite and the like, are composed of silicate layers that have a thickness of about 1 to a few nanometers. Dispersions of such layered clay materials in polymers are frequently referred to as polymer-based nanocomposites.

Recently, there has been considerable interest in forming nanocomposites as a means to improve the mechanical properties of polymers. Specifically, nanocomposites of polymers have been shown to generally result in improved mechanical properties such as heat deflection temperature, modulus, tensile strength as well as fire retardancy.

U.S. Pat. No. 5,652,284 to Eidt, Jr., et al. (assigned to Exxon Research & Engineering Company) discloses a composite material that comprises an elastomer, from about 0.1 wt. % to about 15 wt. % of a layered mineral, and from about 0.1 wt. % to about 15 wt. % of asphalt; the aforesaid wt. % are based on the total weight of the composition. In the '284 patent, all three of the above components, i.e., the asphalt, elastomer, and layered clay mineral, are blended in melt, solution or in a mixer providing the disclosed elastomer-based nanocomposite composition.

The nanocomposite system disclosed in the Eidt patent contains the elastomer as the major component. Asphalt, on the other hand, is present in a relatively low amount, as compared with the elastomer, in this prior art nanocomposite system. Hence, the '284 (Eidt) patent discloses an elastomer-based nanocomposite, not an asphalt-based nanocomposite as is the subject of the present application. Asphalt-based nanocomposites differ from elastomeric-based nanocomposites in that in the former asphalt is present as the major component of the system. Asphalt molecules are the intercalating or exfoliating agent.

SUMMARY OF THE INVENTION

The present invention relates to an asphalt-based nanocomposite, methods of preparing the asphalt-based nanocomposite, and coated articles, such as roofing products, that contain the inventive asphalt-based nanocomposite as a coating. In a particular example, the asphalt-based nanocomposite can be used as a coating for any material layer of a roofing shingle. It is again worth noting, that the term "asphalt-based nanocomposite" denotes a composite material comprising asphalt as the major component. This system is distinct from polymer-based nanocomposites of the prior art, in which a polymer is the major component.

The asphalt-based nanocomposite of the present invention comprises about 1 to about 15 wt. % of a layered clay mineral and an asphalt flux or derivative thereof. The asphalt flux or derivative thereof is the major component of the inventive asphalt-based nanocomposite and it is typically present in an amount from about 35 to about 99 wt. % in unfilled systems (systems without fillers such as $CaCO_3$). More typically, the asphalt-based nanocomposite of the present invention comprises from about 1 to about 10 wt. % of said layered clay mineral and from about 98 to about 90 wt. % of asphalt in unfilled systems. In filled systems, the fillers or the stabilizers such as $CaCO_3$ comprise up to 70% of the weight of the final nanocomposite systems. The weight percentages (wt. %) are based on the total weight of the nanocomposite system.

In addition to the above components, the asphalt-based nanocomposite can include conventional fillers, additives, pigments, dispersants, defoamers, solvents, microbiocides, thickening agents, fire retardants, pH modifiers, wetting agents, light stabilizers, and/or adhesion promoters. Rubbery polymers or elastomers can also be present in the nanocomposite of the present invention to impact or modify properties such as, for example, fracture toughness, cold temperature behavior, and flow behavior. When present, the aforementioned components are employed in amounts that are less than the asphalt component. Typically, the aforementioned optional components are present in the inventive asphalt-based nanocomposite in an amount from about 1 to about 15 wt. %, with an amount from about 5 to about 12 wt. % being even more typical.

The present invention also provides coated articles that include a substrate (woven or non-woven, organic or synthetic or any other appropriate combination thereof) having at least one surface that is coated with the inventive asphalt-based nanocomposite. The term "substrate" is used in the present invention to include the base layer of any product, or any material layer that is applied to the base layer. For example, when a shingle is to be coated with the asphalt-based nanocomposite, the inventive nanocomposite can be applied to the glass mat or organic-based fabric, or any material layer applied atop those base layers. Any type of substrate may be coated with the inventive asphalt-based nanocomposite including, for example, woven fabrics or non-woven scrims. The nanocomposite of the present application thus has application in numerous industries including, for example, building materials products, pavements, sound damping, or any other applications where asphalt composites are desirable or currently in use and the like.

Another aspect of the present invention relates to various methods of preparing the inventive asphalt-based nanocomposite. In particular, the asphalt-based nanocomposite of the present invention can be prepared using (1) a direct blending method; (2) a method in which asphalt is first fractionated into its multiple (usually four) components and then a layered clay mineral is blended therein; (3) a method in which a layered clay mineral is added to an asphalt flux or derivative thereof prior to blowing (i.e., oxidizing); or (4) a method in which asphalt flux or its derivative is first solubilized in an organic solvent, then mixed with a layered clay mineral and thereafter evaporated to remove the organic solvent.

DETAILED DESCRIPTION OF THE INVENTION

The present invention, which provides an asphalt-based nanocomposite, coated articles that include the asphalt-based nanocomposite, as well as various methods of preparing the asphalt-based nanocomposite, will now be described in greater detail.

As stated above, the present invention provides an asphalt-based nanocomposite that includes an asphalt flux or derivative thereof and a layered clay mineral. The term "asphalt flux" denotes the residual cut (i.e., bottom cut) from a vacuum tower or a crude refinery. The asphalt flux is a complex mixture that includes many chemical species such as, for example, asphaltenes, resins, cyclics and saturates. The asphalt flux employed in the present invention is obtained from all types of crude oils and crude oil sources. The asphalt flux derivatives include partially or fully oxidized asphalt—also known in the industry as raw coating—and the like.

In the case of unfilled systems, the asphalt flux or derivative thereof is the major component of the inventive unfilled asphalt-based nanocomposite. Typically, the asphalt component is present in the final composite in an amount from about 35 to about 99 weight %. The nanoagent (clay particles) such as Cloisite 15A is present in an amount from 1 to about 15% with an amount from about 2 to about 10 weight % being more preferred. The rest is made up of filler such as $CaCO_3$ and/or rubbery elastomers or other additives when present. It is further emphasized that the weight (wt.) % of all components is based the total weight % of the final product, i.e., the asphalt-based nanocomposite.

In the case of filled systems, the filler can be present anywhere between and 70% but more commonly between 55 and 70%. In addition, rubbery polymers or elastomers may be present up to 15% and the asphalt component another 15% by weight %. The remainder—up to 15% such as Cloisite 15A—is accounted for by the nanoagent or nanoclay. It is further emphasized that the weight (wt.) % of all components is based the total weight % of the final product, i.e., the asphalt-based nanocomposite.

A layered clay mineral also referred to as nanoagent or nanoclay such as Cloisite 15A mentioned above and throughout this document is capable of being intercalated can be employed in the present invention. Typically, however, layered silicate minerals are employed in the present invention as the nanoparticles or nanoagent. The layered silicate minerals that can be employed in the present invention include natural and artificial minerals capable of forming intercalation or exfoliated compounds. The term "intercalation" denotes an accommodation of inorganic and organic 'guest' molecules or ions between expandable layers of matrix material such as asphalt. The term "exfoliation" refers to complete and uniform dispersing of the nanomolecules in continuous matrix phase (asphalt). Non-limiting examples of such minerals include, for example, smectitite clay, montmorillonite, saponite, saporite, beidellite, montronite, hectorite, stevensite, vermiculite, and hallosite. Of these, montmorillonite is preferred.

In the practice of the present invention it is particularly preferred that the layered silicate mineral be modified by having been treated with a modifying agent. Typical modifying agents are onium salts. Particularly preferred modifying agents are hydrocarbyl onium salts represented by the formula $A^-[M^+R^1R^2R^3R^4]$ and $Ag^-P_y^+R_4$, where $A^-$ denote an anion such as OH, $NO_3$, $SO_4$, Cl and the like, M denotes N, S or P; $R^1$, $R^2$, $R^3$ and $R^4$ independently denote hydrogen, allyl, or allyl group, which may be the same or different; Py denotes the pyridinium or alkyl substituted pyridinium group. Preferred modifying agents are those in which M is N. Preferred modifying agents are thus quaternary ammonium salts such as, for example, dimethylbenzyl octadecyl amine (ODA) or distearyl diammonium chloride (DSDAC).

The amount of modifying agent used in the present invention is not critical; however, in general the amount of modifying agent used will be in the range from about 10 to about 10,000% of the cationic exchange capacity of the layered mineral and preferably about equal to the exchange capacity of the layered mineral.

The amount of layered mineral used in forming the composite of the present invention is from about 1 to about 15 wt. % based on the total weight of the composite. More typically, the amount of layered mineral present in the composite is from about 2 to about 10 wt. %.

In accordance with the present invention, the asphalt-based nanocomposite comprises particle filled layered clay minerals dispersed into a matrix of asphalt. The asphalt molecules intercalate (or exfoliate) between the clay mineral layers. Because of the particle size of the layered mineral, the composite of the present invention is characterized as a nanocomposite. The asphalt-based nanocomposite of the present invention is a nano-dispersion that is characterized as having higher modulus, higher melt viscosity as well as new crystallographic order evidenced in wide-angle X-ray diffraction (WAXD) studies. Such nanocomposites have superior tensile strength and significantly higher Young's modulus relative to their respective raw or filled coatings without nanoagents.

The asphalt-based nanocomposite of the present invention, which comprises at least the above-mentioned components, i.e., asphalt and layered clay mineral, may also include other optional components that are typically employed in coating compositions. For example, the nanocomposite of the present invention can include any of the following components:

fillers or stabilizers such as calcium carbonate, talc, white sand and the like;

pigments such as, for example: titanium dioxide, calcium carbonate, colemanite, alumina trihydrate (ATH), borate compounds, and mixtures thereof.

dispersants such as potassium triphosphate, acrylic polymers or copolymers, and the like;

fire retardants such as graphite, alumina trihydrate (ATH), zinc borate, alkali metal silicates, and the like;

rubbery polymers such as styrene-butadiene-styrene (SBS), styrene-isoprene-styrene (SIS), atactic polyproylenene (aPP), and the like. The rubbery polymers can affect the fracture toughness and flow behavior of the resultant nanocomposite;

defoamers that are capable of preventing foaming;

solvents that are capable of serving as a coalescing agent such as ethylene glycol, propylene glycol, alcohols, and the like;

microbiocides that serve as fungicides, e.g., zinc oxide;

thickening agents such as hydroxethyl cellulose, polyurethane, and the like;

$P^H$ modifiers such as aqueous ammonia;

wetting agents such as siloxanes;

light stabilizers such as hindered amines (HALS);

adhesion promoters such as hydrocarbon resins.

tackifiers such as modified rosins and rosin esters like Staybelite and Pentalyn, resins such as polyterpenes such as Piccolyte S115, the terpene-phenolics such as Schenectady's SP-553, phenol-formaldehyde resins such as Schenectady's SP-1068, the hydrocarbons like Escorez 1102, Escorez 1304, and Escorez 1315.

process oils such as mineral oil, etc.

The optional components mentioned above are present in the nanocomposite of the present invention in amounts that are well known to those skilled in the art. The amounts can vary depending on the type and number of optional components employed. For example, when a filler is present in the nanocomposite of the present invention, it is typically present in an amount from about 30 to about 70 wt. %. When a pigment is present in the nanocomposite of the present invention, it is typically present in an amount from about 2 to about 15 wt. %. Of the various optional components listed above, fillers such as $CaCO_3$ (calcite or dolomite or a mixture of) are preferably present in the inventive nanocomposite.

The asphalt-based nanocomposite of the present invention can be prepared using the following four methods: (1) a direct blending method; (2) a method in which asphalt is first fractionated/distilled into multiple (usually four) components and then a layered clay mineral is blended with one of the components, typically asphaltenes; (3) a method in which a layered clay mineral is added to an asphalt flux or derivative thereof prior to blowing (i.e., oxidizing); or (4) a method in which asphalt flux or derivative, i.e. blown asphalt (also called raw coating) is first solubilized in an organic solvent, then mixed with a layered clay mineral and thereafter evaporated to remove the organic solvent. Each of the methods mentioned above will now be described in greater detail.

(1) Direct Blending

In the direct blending method, the asphalt-based nanocomposite is prepared by combining the layered mineral, the asphalt and any optional component in the desired ratios. The raw coating is heated in an oven at 204° C. till it is completely melted (in about an hour or so). This melt is then weighed to the desired amount and clay is added while continuously stirring and heating at about 222° C. Blending of the various components of the inventive nanocomposite typically occurs at nominal temperature of about 222° C.). Blending can be performed under low shear conditions. By "low shear" using a laboratory mixer such as that by IKA at 500-1200 rpm mixing speed capable of providing and maintaining a fine dispersion.

(2) Fractionating/Distillating Method

In the fractionating method, the asphalt-based nanocomposite of the present invention is prepared by first providing a raw asphalt coating and then fractionating/distillating the raw coating into its four main components. The raw asphalt coating includes any of the asphalt fluxes or derivative mentioned above. The procedure involves dissolving asphalt in n-butanol (or any other suitable organic solvent) with stirring and gentle heating (65-100° C.). Several washes of butanol results in asphaltenes separating from the other components, namely polar aromatics, napthenes and saturates. Butanol is then allowed to dry out completely to obtain asphaltenes. The supernatant butanol solution is then evaporated and concentrated down to a thick, dark oily liquid. An alliquote of this liquid is then dissolved in acetone and chilled to −25° C. This results in precipitating saturated oils that is filtered out using a Buckner funnel. The solution, now free of any precipitate, contains aromatics and naphtenes. Alternatively, procedure as given in ASTM D 6560-00 (Test Method for Determination of Asphaltenes (Heptane Insolubles) in Crude Petroleum and Petroleum Products) can be used.

After separating the raw asphalt coating into its four main components, a desired amount of layered clay mineral is added to one of the fractions. Preferably, the layered clay mineral is added to the asphaltene fraction. This addition typically occurs at a temperature of about 200° C. in any conventional type of mixing apparatus, such as a blender. The blending can be performed at low shear conditions. After combining the layered clay mineral into the first selected fraction and blending, the blended admixture of layered clay mineral and first selected fraction is remixed with the three remaining asphalt fractions. When present the optional components can be added either to the initial blended admixture or during the remix process.

(3) In-Situ Blowing Method

In this method, the asphalt-based nanocomposite is prepared in-situ by adding a desired amount of layered clay mineral into a non-blown asphalt flux or derivative thereof. The admixture is then subjected to oxidation. The oxidation typically occurs in a conventional blowing still or other like apparatus that is capable of blowing the admixture. The oxidation is performed in any oxidizing atmosphere such as $O_2$, air, ozone and the like. Oxidation, i.e., blowing, is typically performed at a temperature of about 500° C. The oxidation converts the admixture of asphalt flux and layered mineral clay into the inventive asphalt-based nanocomposite.

(4) Solvent Method

In the solvent method, an asphalt-based nanocomposite is prepared by first solubilizing asphalt in an organic solvent, then mixing the solubilized asphalt solution with a layered clay mineral and thereafter evaporating to remove the organic solvent.

The organic solvent used in solubilizing asphalt includes an organic solvent that is capable of dissolving, i.e., emulsifying, asphalt. Examples of organic solvents that can be employed for this purpose include, but are not limited to: straight chain or branched alcohols such as butanol, pentane, heptane, toluene, etc. The amount of organic solvent used to solubilize the asphalt may vary depending on the initial amount of asphalt that needs to be solubilized. Typically, organic solvent from about 50 to about 150 wt. % of asphalt is required for solubilization. The solubilization occurs at nominal room temperature but preferably between 65-100° C. Alternatively the solubilization can occur at a temperature that is above nominal room temperature, but below the boiling point of asphalt and/or the organic solvent. The solubilization is typically performed under constant stirring.

After solubilizing the asphalt, an appropriate amount of layered clay mineral is added and blended using conditions as described in the direct blending method. Following this step, the organic solvent is evaporated off by heating the blended nanocomposite to a temperature that is at, or above, the boiling point of the organic solvent. Alternatively, the evaporation may be performed under vacuum or by blowing an inert gas over the nanocomposite sample.

The nanocomposite provided by any of the four methods mentioned above can be applied immediately to a surface of any material layer, including the base or substrate layer, of a particular product or the resultant mixture can be stored for several weeks or months prior to application. In particular, the asphalt-based nanocomposite of the present invention can be applied to a building materials product such as a shingle.

The asphalt-based nanocomposite of the present invention can be applied to any material layer of a product, especially roofing products like shingles, asphaltic roll products or other related building materials products, by brushing, roller coating, spray coating, dip coating, squeegee and other like coating procedures. The products may or may not have a substrate or strength or a carrier film. The nanocomposite is dried either by the existing atmosphere or, alternatively, blowers can be used. A coating containing the inventive nanocomposite forms after application and drying. The coating can have various thicknesses. The inventive film formed on the product provides a coated article in which the nanocomposite layer is uniformly and continuously present in the region in which is applied.

The asphalt-based nanocomposite can be applied to any material layer including the base layer (i.e., substrate) of a desired product. For example, when the product is a shingle, the asphalt-based nanocomposite of the present application can be applied to the glass mat or organic-based fibrous layer that forms the substrate of the shingle. Alternatively, the inventive nanocomposite can be applied to any material layer that is formed above the glass mat or organic-based fiber mat. In the case of coated roll goods, the nanocomposite or other asphaltic layers can be applied by any of the known processes such as dip coating, roll coating, kiss coating, casting on a steel belt (chilled or otherwise), etc. The number of applications is not limited to only one layer of a product. Moreover, the number of reapplications is also not limited to any specific number.

The asphalt-based nanocomposite of the present invention provides a coating to a product that improves the mechanical properties of the product. Some mechanical properties that can be improved include, for example, tensile strength, Young's modulus, penetration, R&B softening point, tear strength, fire retardancy, barrier properties, weatherability, and the like.

One characteristic feature of the inventive asphalt-based nanocomposite resides in the XRD pattern. Specifically, the inventive asphalt-based nanocomposite exhibits a peak at about 3.8 to about 4.0 degrees (two theta) that is not present in the XRD pattern of either the layer clay mineral itself or the asphalt, which is amorphous in character. Moreover, a downward shift in peaks at 2.7 and 7.0 degrees (two theta) which are typically present in a control sample of layered mineral is observed in XRD pattern of the inventive nanocomposites.

The present invention, which has been described in detail above, will now be further described in the examples that follow. In particular, asphalt-based nanocomposites were prepared using each of the four methods described above. The mechanical properties of the resultant asphalt-based nanocomposites prepared by some of the methods are also reported in the following examples.

EXAMPLES

Example 1

Direct Blending Method

In this example, an asphalt-based nanocomposite was prepared using the direct blending method of the present invention. Specifically, Cloisite 15A (a montmorillonite clay supplied by Southern Clay Products, Inc., Gonzales, Tex. in an amount as specified in Table 1, was added along with $CaCO_3$, in an amount as specified in Table 1, to an asphalt raw coating and the admixture was blended together to provide an asphalt-based nanocomposite. A control sample containing a blended admixture of asphalt and $CaCO_3$ was prepared for comparison. The results for each of the sample, in terms of mechanical properties, are shown in Table 1 as well.

TABLE 1

| Direct Blending Results | | |
|---|---|---|
| | Control | 3 wt. % Cloisite 15A |
| Dolomite (wt. %) | 69 | 66 |
| R & B Softening Point (° F.)[A] | 206.5 | 214 |
| Tensile Strength (psi)[B] | 112 ± 7.5 | 155 ± 8.2 |
| Ultimate Elongation (%)[B] | 11.0 ± 1.9 | 5.4 ± 0.7 |
| Young's Modulus (psi)[B] | 12580 ± 5756 | 21080 ± 13650 |

Gage length = 1.5", crosshead speed 0.2 inch/min, width = 0.5".
The thickness was measured for each sample and was accounted for in the calculation.
In Table 1,
[A]was performed per ASTM D 36,
[B]was performed per ASTM D 882.

The results in Table 1 illustrate that the samples containing the asphalt-based nanocomposite have improved mechanical properties, with the exception of ultimate elongation, as compared to the controlled sample. The decrease in ultimate elongation was, however, anticipated since the addition of polymer-based nanocomposites to different systems in the prior art also shows a similar decrease in elongation. The decrease in ultimate elongation is a result of a stiffer product being formed when the nanocomposite is employed.

Example 2

Fractionating/Distillation Method

In this example, an asphalt-based nanocomposite was prepared using the fractionating method of the present invention. Specifically, a raw asphalt coating was fractionated by a conventional asphalt fractionation process into its four components, e.g., asphaltenes, polar aromatics, napthenes, and saturates, using butanol as the distillate. Three (3) weight % Cloisite 15A was added to the asphaltene fraction and blended before being remixed with the remaining fractions. CaCO3 is added after recombining all the constituents of asphalt. A control sample was made in the same fashion except that no Cloisite 15A was added. The amount of additive used in the inventive sample and the control sample are specified in Table 2 below. Dog-bone specimens were made in each case. The mechanical properties of both samples are reported in Table 2 as well.

The test methods used for obtaining the specific measurements in Table 2 are the same as those used in Table 1. The results in Table 2 illustrate that the sample containing the asphalt-based nanocomposite had improved mechanical properties, with the exception of ultimate elongation, as compared to the controlled sample. The decrease in ultimate elongation was, however, anticipated with increased stiffness. Formation of nanocomposites in different systems in the prior art also shows a similar decrease.

TABLE 2

Fractionating/Distillation Method

|  | Control | 3 wt. % Cloisite 15A |
|---|---|---|
| Dolomite (wt. %) | 69 | 66 |
| Tensile Strength (psi) | 112 ± 7.5 | 168 ± 6.8 |
| Ultimate Elongation % | 11.0 ± 1.9 | 2.6 ± 0.7 |
| Young's Modulus (psi) | 12580 ± 5756 | 42017 ± 5195 |

Gage length = 1.5", crosshead speed 0.2 inch/min, width = 0.5".
The thickness was measured for each sample and was accounted for in the calculation.

The decrease in ultimate elongation is a result of a stiffer product being formed when the nanocomposite is formed.

Example 3

In-Situ Blowing Method

In this example, an asphalt-based nanocomposite was prepared using in-situ blowing method of the present invention. Specifically, 3 weight % Cloisite 15A was added to an asphaltic flux in a blowing still. This premix is then oxidized into asphalt-based nanocomposite. After addition, mechanical stirrer was used to enhance homogenization and prevent the sparge from getting blocked.

Figure 1:
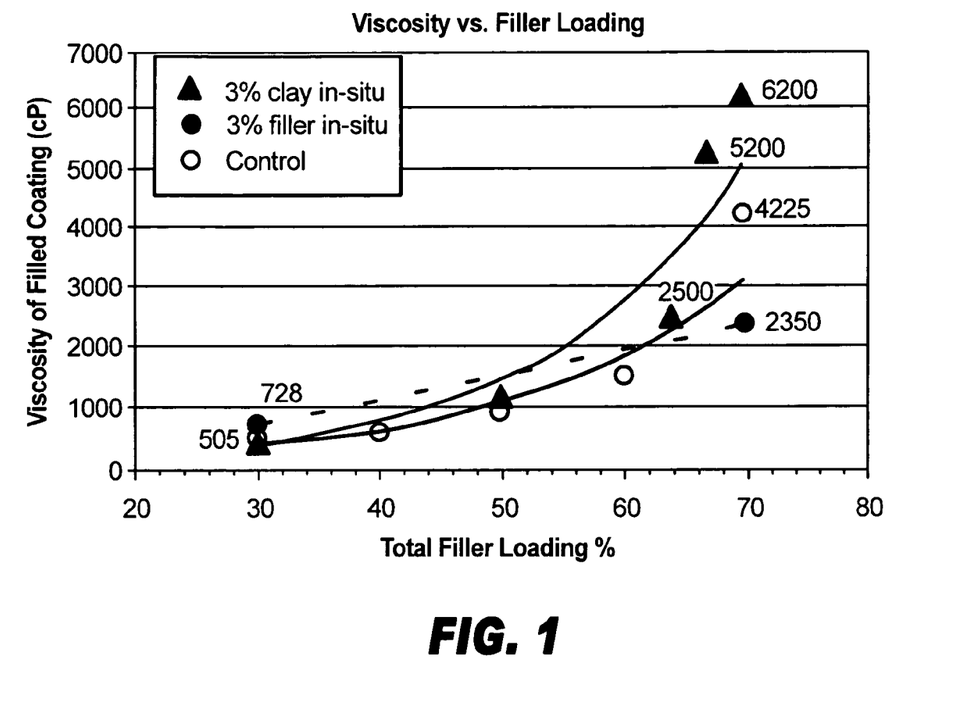
FIG. 1 is a graph showing the softening point as a function of % filler for the inventive asphalt-based nanocomposite prepared in Example 4.

FIG. 1 shows dramatic increase in viscosity relative to when only dolomite type of filler is incorporated in-situ is indicative of nanocomposite formation. The control samples in FIG. 1 refer to blending of $CaCO_3$ to melted flux.

Example 4

Solvent Method

Figure 2:
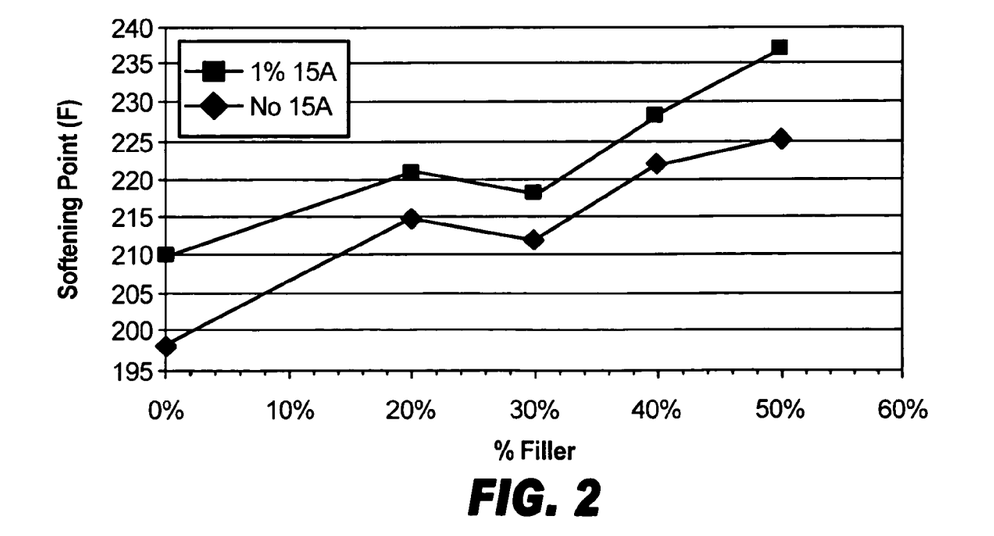
FIG. 2 is a graph showing the melt viscosity as a function of % filler for the inventive asphalt-based nanocomposite prepared in Example 4.
Figure 3:
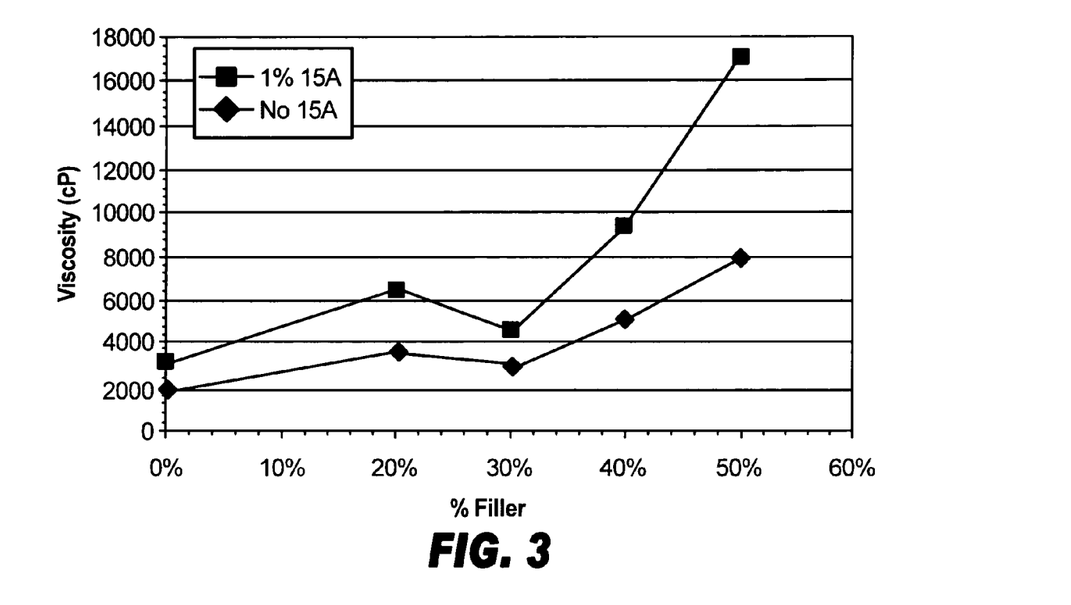
FIG. 3 is a X-ray diffraction (XRD) powder pattern of intensity (counts) vs. 2-Theta (°) for a nanoclay control (Cloisite® 15A nanoclay powder), without asphalt.

In this example, an asphalt-based nanocomposite was prepared using the solvent method of the present invention. Specifically, Cloisite 15A was incorporated into asphalt solubilized with butanol. In the presence of 1 wt. % Cloisite 15A, the softening point as well as melt viscosity of the nanocomposite is substantially higher than that of the controlled sample solubilized in a similar manner (See FIGS. 2 and 3).

The viscosity of 1 wt. % Cloisite 15A in asphalt is twice that of the control. The drop in the viscosity as well as the softening point for the solubilized asphalt samples, with or without clay, when the filler loading level is increased from 20% to 30% is unexpected. Also, the viscosity increase in the case of 1 wt. % Cloisite 15A samples for 50% filler loading is more than double at 17,500 cP than that for the samples without clay at the same 50% filler loading.

X-Ray Diffraction Results on Asphaltic Nanocomposites

Each X-ray diffraction powder pattern was collected by Ashland Analytical Laboratory. using a Siemens D500 Diffractometer using a monochromated copper x-ray source operating at 40 kV/30 mA. Data was collected from 0.5-63° (2-theta) at 0.05° steps using a dwell time of 6 seconds/step. Prior to XRD testing each sample of asphalt film was cut in a disc, inserted in to the circular opening of the XRD sample holder, and securely anchored with a Teflon backing to ensure that the sample remained "flush" with the surface of the holder. The wavelengths used for copper radiation (lambda) were: K alpha weighted-mean, 1.541838 angstroms.

A film of TAMPA RC sample was prepared by placing small pieces of asphalt in an aluminum weighing dish and heating it in an oven at approximately 200° F. After cooling, the film was cut in the shape of a disc and secured in an XRD sample holder as described above.

Figure 4:
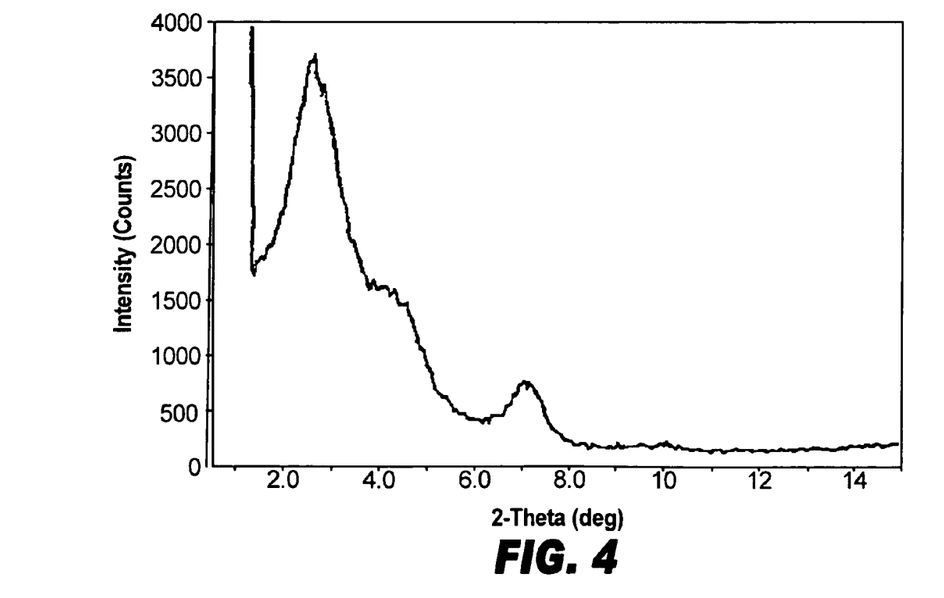
FIG. 4 is a XRD powder pattern plotting intensity (counts) vs. 2-Theta (°) for an asphalt control (identified as TAMPA RC), without a nanoclay.
Figure 5:
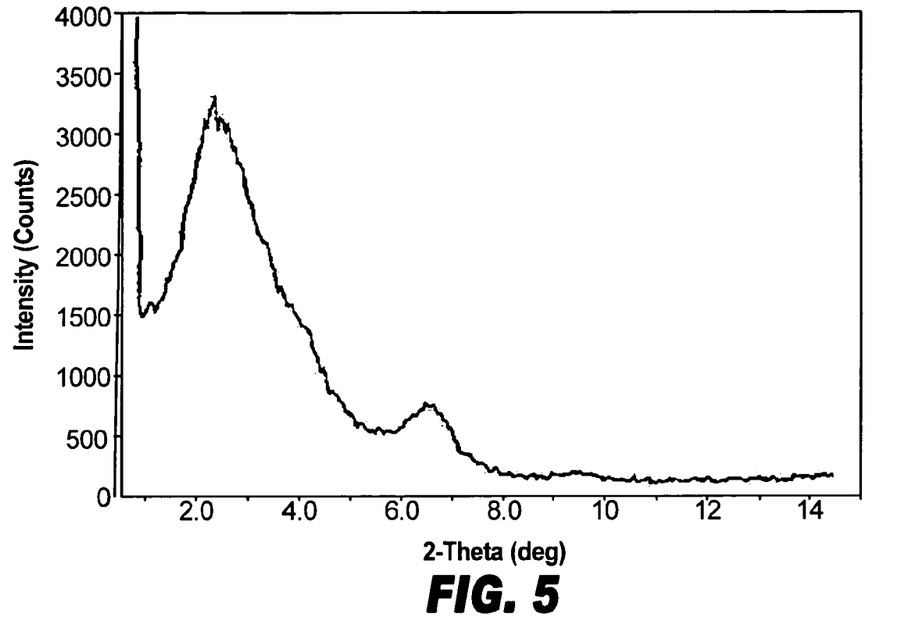
FIG. 5 is a XRD powder pattern plotting intensity (counts) vs. 2-Theta (°) for an inventive asphalt-based nanocomposite that contained 2 wt. % of Cloisite 15A.

FIGS. 4 and 5 show the XRD pattern for Cloisite 15A without asphalt (Control Sample 1). The powder pattern (FIG. 5) for Cloisite 15A is obtained following cryo-milling treatment. Two things appear to be taking place as a result of cryo-milling: (a) There is some broadening of the peaks which is likely due to a reduction in overall particle size. (b) The cryo-milled clay sample shows a primary peak position (2-theta) of approx. 2.9° which is higher than that measured for the "as-received" sample (approx. 2.5°).

Figure 6:
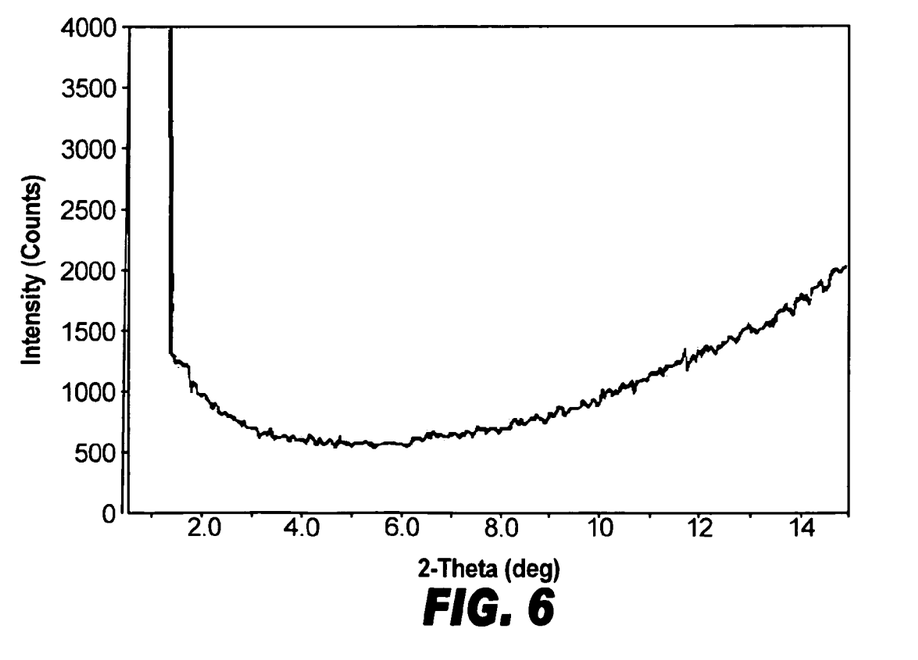
FIG. 6 is a XRD powder pattern plotting intensity (counts) vs. 2-Theta (°) for an inventive asphalt-based nanocomposite that contained 5 wt. % of Cloisite 15A.

The XRD pattern of Cloisite 15A without asphalt (Control Sample 1) includes two peaks, the first one for d(001) is located at 2.6 degrees (2-theta) (corresponds to basal plane d-spacing of 3.39 nm) and the other is at 7.0 degrees (two theta) (d-spacing=1.26 nm). FIG. 6 shows the XRD pattern for an asphalt raw coating without clay (Control Sample 2) and does not show any crystallographic peaks.

Figure 7:
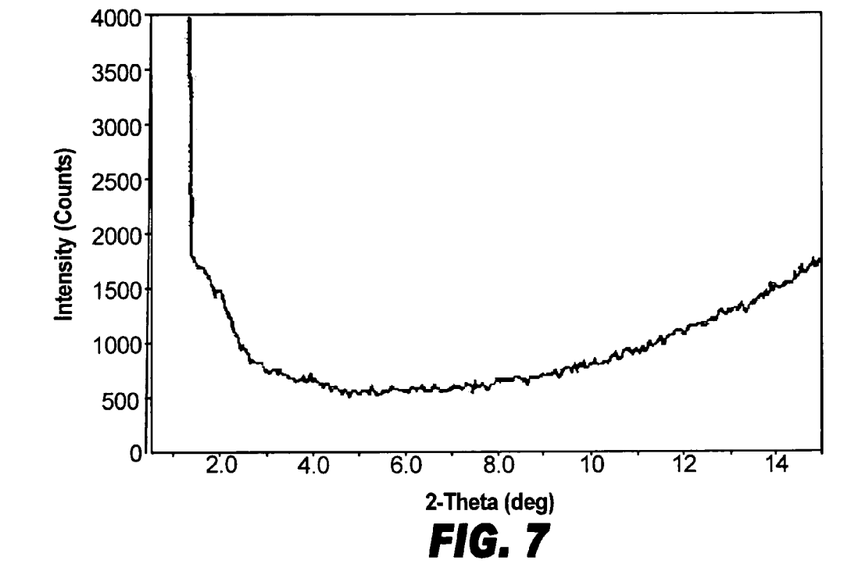
FIG. 7 is a XRD powder pattern plotting intensity (counts) vs. 2-Theta (°) for an inventive asphalt-based nanocomposite that contained 10 wt. % of Cloisite 15A.

FIG. 7 shows XRD pattern for an asphalt-based nanocomposite (A-RCS) containing 2 wt. % Cloisite 15A that was made by solution blending (Inventive Sample 1).

Figure 8:
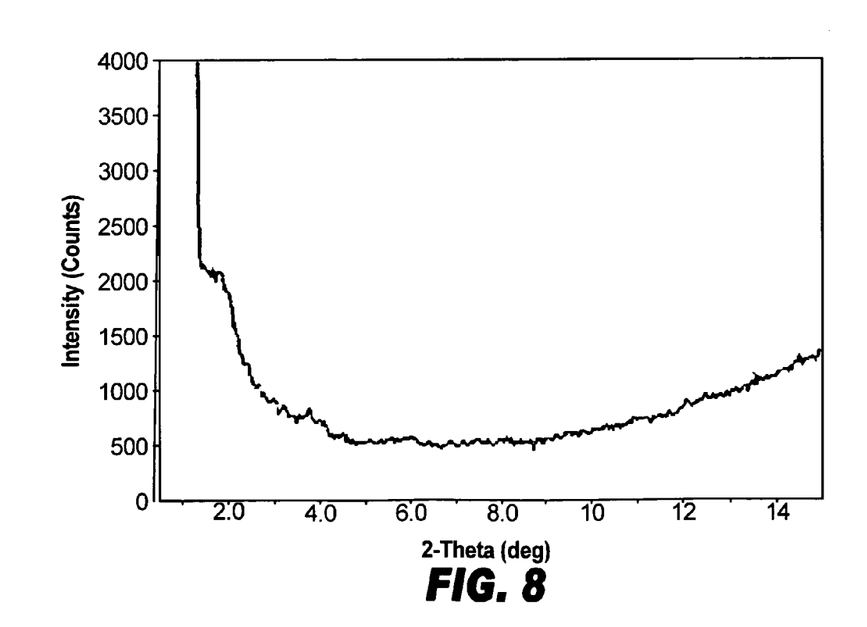
FIG. 8 is a XRD powder pattern plotting intensity (counts) vs. 2-Theta (°) for an inventive asphalt-based nanocomposite (B-RCS) that contained 5 wt. % of Cloisite 15A.
Figure 9:
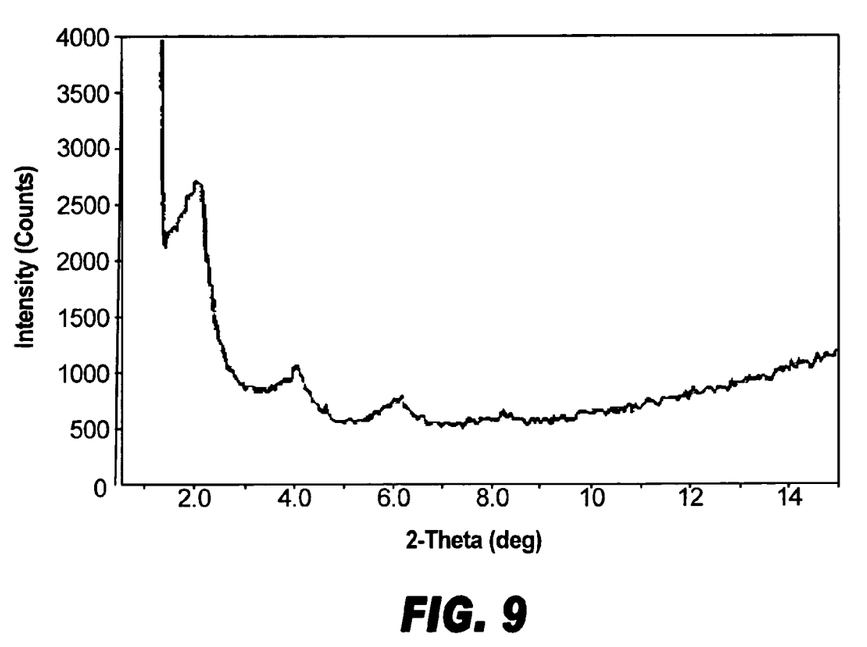
FIG. 9 is a XRD powder pattern plotting intensity (counts) vs. 2-Theta (°) for an inventive asphalt-based nanocomposite (C-RCS) that contained 10 wt. % of Cloisite 15A.

FIG. 8 shows the XRD pattern for an asphalt-based nanocomposite (B-RCS) containing 5 wt. % Cloisite 15A that was made by solution blending (Inventive Sample 2). The XRD pattern of Inventive Sample 2 includes three identifiable peaks; a first peak is located at 1.9 degrees (2-theta), a second peak is located at 3.8 degrees (two-theta) and a third peak is located at 5.8 degrees (two-theta). FIG. 9 shows the XRD pattern for an asphalt-based nanocomposite (C-RCS) containing 10 wt. % Cloisite 15A that was made by solution blending (Inventive Sample 3). The XRD pattern of Inventive Sample 3 includes three identifiable peaks; a first peak is located at 1.9 degrees (2-theta), a second peak is located at 3.8 degrees (two-theta) and a third peak is located at 5.8 degrees (two-theta).

Table 3 gives the observed crystallographic peaks on all the samples—Cloisite 15A clay, raw asphalt coating as well as various inventive samples. While the raw asphaltic coating does not show any peaks due to its non-crystallographic microstructure, the clay shows four distinct peaks at 2-theta of 2.6 (33.8), 4.4 (19.6), 7.0 (12.4) and 9.8 (8.9) degrees. The values in the parentheses are corresponding calculated d-spacing in nanometers.

TABLE 3

Wide-angle X-ray Diffraction (WAXD) Data on Various Samples

| | | | | | | |
|---|---|---|---|---|---|---|
| Cloisite "Standard" | Cloisite Powder | 2.6 (3.38) | 4.4 (1.96) | 7.0 (1.24) | 9.8 (0.89) | |
| A-RCM | Melt blend 2% Cloisite 15A | 1.8 (4.72) | 3.8 (2.31) | 5.8 (1.51) | 7.8 (1.12) | Not Detected |

TABLE 3-continued

Wide-angle X-ray Diffraction (WAXD) Data on Various Samples

| | | | | | | | |
|---|---|---|---|---|---|---|---|
| B-RCM | Melt blend 5% Cloisite 15A | 1.9 (4.47) | 3.8 (2.26) | 5.9 (148) | 7.8 (1.12) | Not Detected | |
| C-RCM | Melt blend 10% Cloisite 15A | 1.8 (4.65) | 3.7 (2.33) | 5.8 (1.52) | 7.7 (1.13) | 9.7 (0.90) | |
| A-RCS | Solvent blend 2% Cloisite 15A | 1.9 (4.51) | 3.9 (2.25) | 5.9 (1.48) | 7.8 (1.12) | 9.7 (0.90) | |
| B-RCS | Solvent blend 5% Cloisite 15A | 1.9 (4.61) | 3.8 (2.30) | 5.8 (1.51) | 7.8 (1.12) | 9.7 (0.90) | |
| C-RCS | Solvent blend 10% Cloisite 15A | 1.9 (4.63) | 3.8 (2.31) | 5.8 (1.51) | 7.7 (1.13) | 9.7 (0.90) | |
| Dolomite Filler "Standard" | Dolomite Powder | | | 6.2 (1.41) Contaminant | 8.8 (0.99) Contaminant | 10.5 (0.83) Contaminant | 31.0 (0.28) 100% Line for Dolomite |
| FC-M | 70% Filler (melt blended) | | | 6.1 (1.44) | 8.6 (1.02) | 10.4 (0.84) | 30.9 (0.28) |
| A-FCM | 68% Filler + 2% Cloisite (melt blended) | Not Detected | 3.8 (2.27) | 6.0 (1.45) | 8.6 (1.01) | 10.4 (0.84) | 30.9 (0.28) |
| FC-S | 70% Filler (solvent blended) | | | 6.1 (1.43) | 8.7 (1.01) | 10.5 (0.84) | 31.0 (0.28) |
| A-FCS | 68% Filler + 2% Cloisite (solvent blended) | 1.8 (4.73) | 3.8 (2.28) | 6.0 (1.45) | 8.7 (1.01) | 10.5 (0.83) | 31.0 (0.28) |
| TAMPA RC "Standard" | Control Raw Coating (Asphalt) | Not Detected | Not Detected | Not Detected | Not Detected | Not Detected | Not Detected |

Calculated d-spacing values in the table are given

Table 3 also gives various peaks observed for melt as well as solvent blended inventive samples (unfilled) identified as A-RCM, B-RCM, C-RCM, A-RCS, B-RCS and C-RCS. In each of these cases, all the four peaks mentioned above and originating from microcrystalline structure of Cloisite 15A clay downshift to two-theta of 1.8-1.9, 3.7-3.9, 5.8-5.9, and 7.7-7.8 degrees with corresponding d-spacing of 4.47-4.51, 2.25-2.33, 1.48-1.51 and 1.12-1.13 nanometers. Thus, in each of these inventive examples, we observe that d-spacing of crystallographic planes in Cloisite 15A has been substantially increased as a result of compounding it with raw asphaltic coating. Those skilled in the art of nanocomposite science will know that this is the most direct and clear evidence of a nanocomposite formation. The increase in d-spacing is indicative of asphalt molecules intercalating the clay planes. In addition, all the solvent blended unfilled samples as well as 10% Cloisite 15A melt blended sample show a new peak at two-theta of 9.7 degrees. This corresponds to a d-spacing of 0.9 nm. This peak is not present in Cloisite 15A clay itself (with or without cryo-milled). This is representative of a new crystallographic order established due to nanocomposite formation via intercalation.

The main crystallographic peak for the dolomite filler is observed at 30.9 degrees with corresponding d-spacing of 0.28 nm. However, due to impurities, it also shows three additional peaks at two-theta of 6.2, 8.8 and 10.4 degrees with corresponding d-spacing of 1.41, 0.99 and 0.83 nm. All the filled samples show these peaks almost at the same location (without downshifting) as expected. On the other hand, downshift does seem to occur for solvent blended filled sample (A-FCS) with 2% Cloisite 15A. This downshift is similar to the downshifts observed for unfilled samples discussed earlier and once again, confirm formation of a nanocomposite as evidenced by increase in the d-spacing to 4.73 nm from 3.38 nm for the d(001) basal plane of Cloisite 15A. This is true for the second peak at 3.8 degrees (2-theta) which in the clay sample is observed at 4.4 degrees. The d-spacing is thus increased from 1.96 nm to 2.28 nm. The other peaks at 7.0 and 9.8 degrees are hard to detect due to the overwhelming presence of the peaks originating from the dolomite filler based impurities.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method of preparing a shingle, the method comprising mixing from about 1 to about 15 weight % of a layered clay mineral into an asphalt flux of partially or fully oxidized asphalt to form a nanocomposite;
wherein the mixing is performed in a blender than can operate at low shear conditions at 500-1200 rpm mixing speed;
applying a coating comprising the nanocomposite to at least one surface of a substrate wherein said substrate is a base layer or a material layer of a building materials product; and wherein said building materials product is a shingle.

2. A method of preparing a nanocomposite comprising fractionating an asphalt flux or partially or fully oxidized asphalt into an asphaltene fraction, a polar aromatic fraction, a naphthene fraction and a saturate fraction;
mixing from about 1 to about 15 weight % of a layered clay mineral into one of said fractions;
and recombining said fraction containing said layered clay mineral with said other fractions.

3. The method of claim 2 wherein said fractionating is performed in a column or tower.

4. The method of claim 2 wherein said mixing of said layered clay mineral occurs in an asphaltene fraction.

5. A method of preparing a nanocomposite comprising introducing from about 1 to about 15 weight % of a layered clay mineral into an asphalt flux or partially or fully oxidized asphalt to provide a premix; and
oxidizing (blowing) the premix.

6. The method of claim 5 wherein said oxidizing occurs in a blowing still.

7. The method of claim 5 herein said oxidizing is performed in an oxygen-containing atmosphere.

8. A coated article comprising
a substrate having at least one surface that is coated with a nanocomposite, said nanocomposite comprising an asphalt flux or partially or fully oxidized asphalt; and
a layered clay mineral in an amount from about 1 to about 15 weight %, based on the total weight of the nanocomposite;
wherein said substrate is a base layer or a material layer of a building materials product, and wherein said building materials product is a shingle.

* * * * *